United States Patent
Lawrence et al.

(10) Patent No.: US 7,548,335 B2
(45) Date of Patent: Jun. 16, 2009

(54) PRINT JOB QUEUING AND SCHEDULING SYSTEMS AND METHODS

(75) Inventors: Mark A. Lawrence, Kirkland, WA (US); Adrian F. Maxa, Kirkland, WA (US); Feng Yue, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 11/067,361

(22) Filed: Feb. 25, 2005

(65) Prior Publication Data

US 2006/0193006 A1    Aug. 31, 2006

(51) Int. Cl.
G06K 15/00 (2006.01)
G06F 3/12 (2006.01)
G06F 9/46 (2006.01)

(52) U.S. Cl. ............ 358/1.15; 358/1.12; 358/1.14; 358/1.16; 358/1.18; 718/103; 718/104; 718/105; 718/107

(58) Field of Classification Search ............ 358/1.15, 358/1.14, 1.16, 1.18, 1.13; 709/102, 103; 718/103, 104, 105, 107
See application file for complete search history.

(56) References Cited

U.S. PATENT DOCUMENTS

| | | | |
|---|---|---|---|
| 6,621,589 B1* | 9/2003 | Al-Kazily et al. | 358/1.15 |
| 2002/0135796 A1* | 9/2002 | Alexander | 358/1.15 |
| 2002/0171864 A1* | 11/2002 | Sesek | 358/1.15 |
| 2003/0020944 A1* | 1/2003 | Bhogal et al. | 358/1.15 |
| 2003/0103777 A1* | 6/2003 | Nakamura et al. | 399/82 |
| 2004/0001215 A1* | 1/2004 | Kurotsu | 358/1.13 |
| 2006/0033958 A1* | 2/2006 | d'Entrecasteaux | 358/1.16 |

* cited by examiner

Primary Examiner—Mark K Zimmerman
Assistant Examiner—Haris Sabah
(74) Attorney, Agent, or Firm—Lee & Hayes, PLLC (57) ABSTRACT

Printing systems and methods are described in which the priorities of print jobs are programmable. A scheduler component oversees print job management and scheduling, and works in concert with components called prioritizers, to provide for ease of programming and customization. In at least some embodiments, an interface to the system is provided to allow prioritizers to be programmed and inserted to customize the behavior of the scheduler according to different print job properties. In at least some embodiments, the system utilizes a model for the relative prioritization of print queues in the system to enforce a fair to balancing of system resources between print queues. In at least some embodiments, the system can independently schedule the rendering and printing operations when printing a job and can use a heuristic known as "starvation risk" to help ensure that throttling rendering in the system does not result in device starvation.

16 Claims, 4 Drawing Sheets

PRINT JOB QUEUING AND SCHEDULING SYSTEMS AND METHODS

TECHNICAL FIELD

This invention relates to print job queuing and scheduling systems and methods.

BACKGROUND

A print server typically schedules jobs to be printed to a set of physical or logical printers. Since some print jobs can typically be relatively large and can consume a large amount of resources, the perceived and actual performance of a print server can be dramatically impacted when the system allows a job to be printed.

For example, if a sufficient number of jobs are scheduled to be rendered or printed, the physical memory of the computer can be exhausted which can lead to what is known as "thrashing". Thrashing is a condition that occurs when virtual memory is repeatedly written to and from the hard disk. This, in turn, can lead to a situation in which less progress is made, with regard to processing the print jobs, than if the jobs which resulted in the system thrashing were not scheduled. In this situation, a scheduling decision can affect the actual performance of the system. Similarly, if enough data is read independently from multiple files on a hard disk, performance can actually be degraded since this induces extra head movement on the disk.

In another example, consider that a large job and a set of smaller jobs need to be printed. In this situation, more users will receive their jobs more quickly if the large job is printed after the smaller jobs. In this situation, the perceived performance, rather than actual performance, is degraded since the throughput of the server may be no lower in either case.

Since print jobs can tend to vary in size and/or desired priority it would be desirable to provide a means that allows print server administrators to control the priority of the jobs in the system, and to also schedule jobs at certain times. In addition, it would be desirable to be able to provide users with the ability to change the priority of their jobs, if they are approved by an administrator for doing so.

Accordingly, this invention arose out of concerns associated with providing improved print job queuing and scheduling systems and methods.

SUMMARY

Printing systems and methods are described in which the priorities of print jobs are programmable. In one embodiment, a scheduler component oversees print job management and scheduling, and works in concert with components called prioritizers to provide for ease of programming and customization. In at least some embodiments, an interface to the system is provided to allow prioritizers to be programmed and inserted to customize the behavior of the scheduler according to different print job properties. In at least some embodiments, the system utilizes a model for the relative prioritization of print queues in the system to enforce a fair balancing of system resources between print queues. In at least some embodiments, the system can independently schedule the rendering and printing operations when printing a job and can use a heuristic known as "starvation risk" to help ensure that throttling rendering in the system does not result in device starvation.

DETAILED DESCRIPTION

Overview

In the embodiments described below, a printing system is described in which the relative priority of print jobs in the system is programmable. In at least some of the embodiments, a scheduler component oversees print job management and scheduling, and works in concert with components called prioritizers to provide for ease of programming and customization. In at least some embodiments, an interface to the system is provided to allow prioritizers to be programmed and inserted to customize the behavior of the scheduler according to different print job properties. Hence, a system administrator who may not necessarily be versed in various programming languages can, in at least some embodiments, easily define custom behaviors for managing print jobs. For example, in at least some embodiments a user interface is provided to allow various parametric values for a prioritizer to be configured by an administrative user. The administrative user can also change the relative ranking of prioritizers. As such, less programmatically-skilled users have the ability to further customize the behavior of the scheduler without requiring the ability to use a programming language. In at least some embodiments, print jobs can be programmatically delayed or boosted in time based on their particular characteristics.

Further, in at least some embodiments, the system utilizes a model for the relative prioritization of print queues in the system to enforce a fair (or, at the administrator's discretion—a biased) balancing of system resources between print queues. This allows the system to fairly balance job load across printers in the system. In addition, the mechanism that is used to fairly determine load across the various queues is also programmable in a manner that allows a less-experienced user to customize the system's behavior.

In at least some embodiments, the system can achieve its operation with a computational complexity of O(1) in order to determine that no further processing is necessary, as will be appreciated by the skilled artisan.

In at least some embodiments, the system can independently schedule the rendering and printing operations when printing a job. This allows it to achieve a desirable device throughput for the I/O-bound task of sending print output to the printers, while limiting the number of CPU and memory intensive rendering tasks in the system. In an embodiment described below, the system uses a heuristic known as "starvation risk" to help ensure that throttling rendering in the system does not result in device starvation.

In at least some embodiments, the system allows a natural pooling model to be expressed. This allows both regular and administrative users of the system to see all the jobs that impact their ability to print on a particular queue, as will become apparent below.

In at least some embodiments, the system achieves these goals with a CPU complexity that is O(1) in order to determine whether another job must be printed, and $O(\log_2 J)+O(\log_2 P)$ for a scheduling decision, where J is the number of jobs in a queue, and P is the number of physical printers in the system. Thus, for example, in a system with two hundred queues and a million jobs that are evenly distributed, the system will typically utilize only 20 comparisons to reach a scheduling decision, as compared with current systems which can require 200 million comparisons to reach a scheduling decision.

Exemplary Client Device/Print Server Components

Preliminarily, before describing the various embodiments, the following description of a computing device is provided. The various components of the computing device can be utilized to implement both a client and a print server, as will be appreciated by the skilled artisan.

Figure 1:
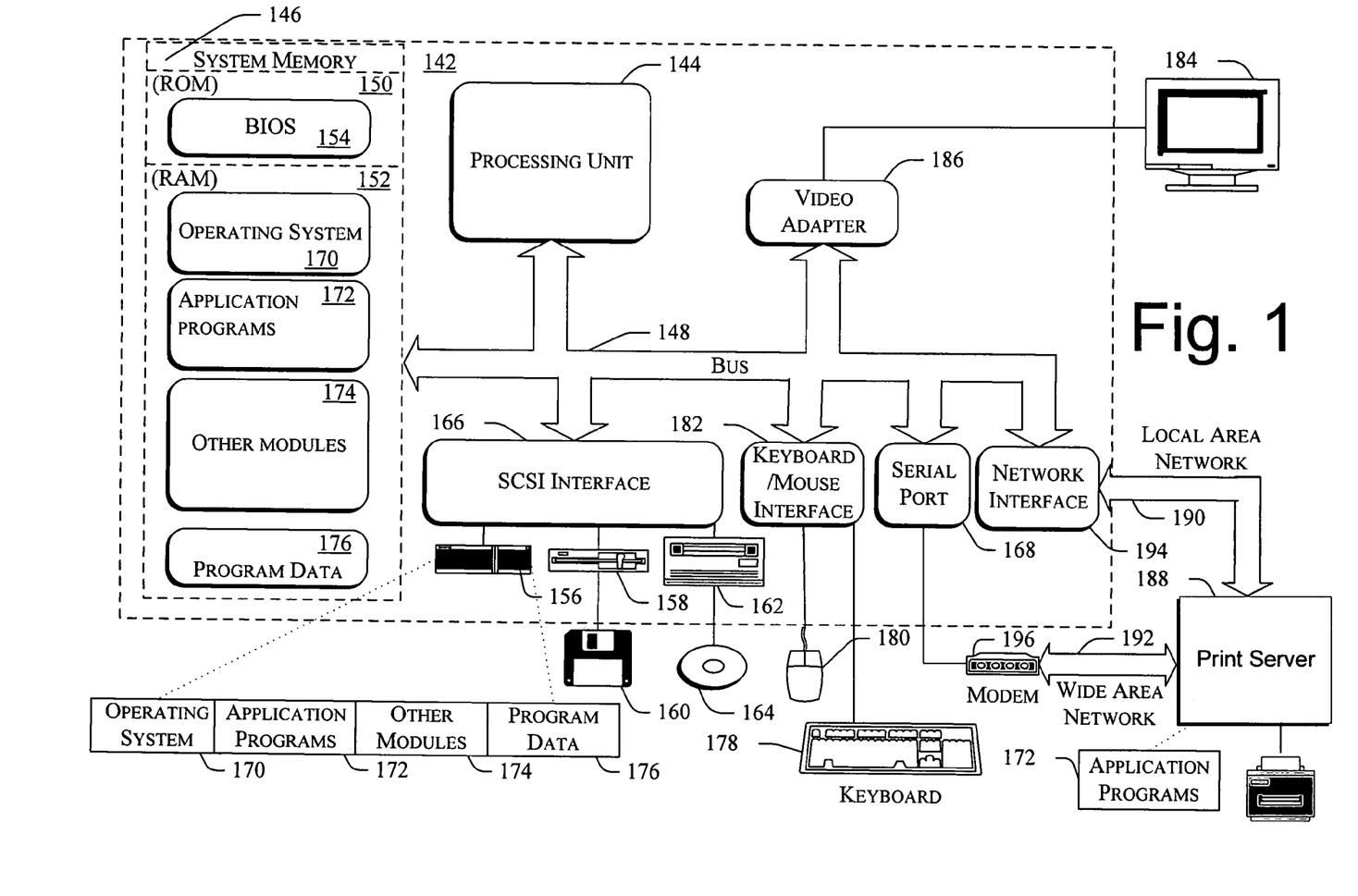
FIG. 1 is a high level block diagram of a computing device, components of which can be utilized to implement one or more embodiments.

As such, FIG. 1 shows an exemplary computing device that can utilize the embodiments described below. It is to be appreciated and understood that the described computing device is provided for exemplary purposes only, and is not intended to limit application of the claimed subject matter to only one particular type of computing device.

Computing device 142 comprises one or more processors or processing units 144, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures. The system memory 146 comprises read only memory (ROM) 150 and random access memory (RAM) 152. A basic input/output system (BIOS) 154, containing the basic routines that help to transfer information between elements within computing device 142, such as during start-up, is stored in ROM 150.

Computing device 142 can further comprise a hard disk drive 156 for reading from and writing to a hard disk (not shown), a magnetic disk drive 158 for reading from and writing to a removable magnetic disk 160, and an optical disk drive 162 for reading from or writing to a removable optical disk 164 such as a CD ROM or other optical media. The hard disk drive 156, magnetic disk drive 158, and optical disk drive 162 are connected to the bus 148 by an SCSI interface 166 or some other appropriate interface. The drives and their associated computer-readable media provide nonvolatile storage of computer-readable instructions, data structures, program modules and other data for computer 142. Although the exemplary environment described herein employs a hard disk, a removable magnetic disk 160 and a removable optical disk 164, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 156, magnetic disk 160, optical disk 164, ROM 150, or RAM 152, including an operating system 170, one or more application programs 172 (such as a user agent or browser), other program modules 174, and program data 176. A user may enter commands and information into computer 142 through input devices such as a keyboard 178 and a pointing device 180. Other input devices (not shown) may comprise a microphone, joystick, game pad, satellite dish, scanner, or the like. These and other input devices are connected to the processing unit 144 through an interface 182 that is coupled to the bus 148. A monitor 184 or other type of display device is also connected to the bus 148 via an interface, such as a video adapter 186. In addition to the monitor, personal computers typically comprise other peripheral output devices (not shown) such as speakers and printers.

Computer 142 commonly operates in a networked environment using logical connections to one or more remote computers, such as a print server 188 which, in turn, is connected to one or more printers. The print server 188 may be another personal computer, a server, a router, a network PC, a peer device or other common network node, and typically comprises many or all of the elements described above relative to computer 142. The logical connections depicted in FIG. 1 comprise a local area network (LAN) 190 and a wide area network (WAN) 192. Such networking environments are commonplace in offices, enterprise-wide computer networks, intranets, and the Internet.

When used in a LAN networking environment, computer 142 is connected to the local network through a network interface or adapter 194. When used in a WAN networking environment, computer 142 typically comprises a modem 196 or other means for establishing communications over the wide area network 192, such as the Internet. The modem 196, which may be internal or external, is connected to the bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Embodiment Overview and Description

Figure 2:
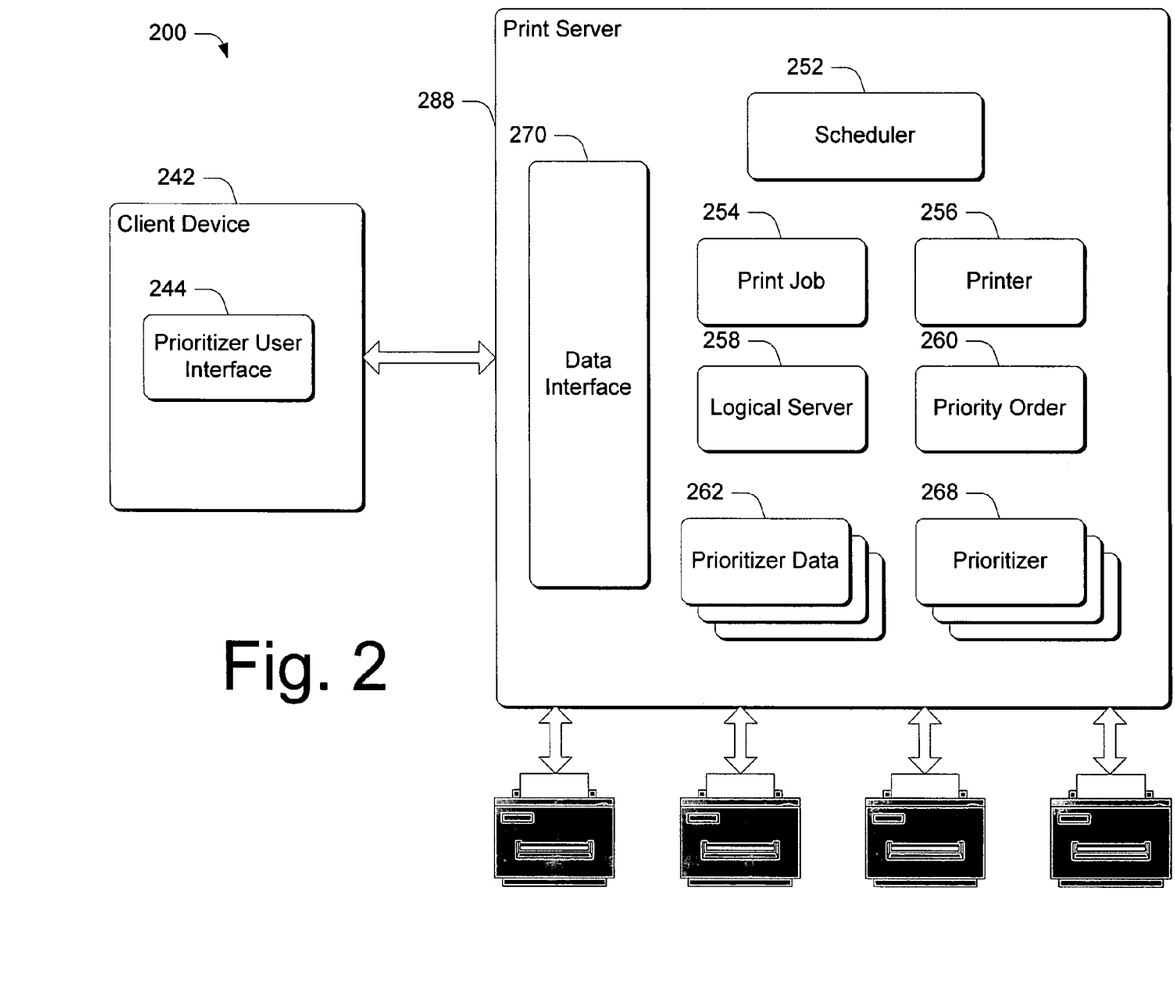
FIG. 2 is a block diagram that illustrates exemplary components of a client device and print server in accordance with one embodiment.

FIG. 2 shows a high level view of an exemplary system in accordance with one embodiment, generally at 200. In the description that follows, individual objects are described, along with some of their associated properties and/or characteristics each under their own headings. Following this, a section entitled "Determining a Job's Priority" describes how a particular print job's priority is represented and the role of the prioritizers in the prioritization process.

Preliminarily though, before a description of the specific implementation example of FIG. 2, consider the following discussion of some principles and considerations that underlie the specific implementation described below.

Specifically, in the discussion that follows, the notion of a prioritizer or prioritizer object is introduced. The prioritizer is the programmatic mechanism that allows the printing system to be programmable. Essentially, a prioritizer looks at a particular print job and produces a weight or a time associated with the print job. An administrator can define a sequence of prioritizers and can associate this sequence of prioritizers with a particular print queue. The sequence of prioritizers then produces, for a particular print job, a tuple which is a vector of values that can include weight values and/or time values. Each prioritizer can be specifically configured by a system administrator by providing configuration data for the prioritizer via a user interface that is described below. Tuples that are produced for a particular print job can then be interpreted and processed by a scheduler object to schedule the particular print jobs in the printing system.

In operational principle then, when a system administrator wishes to program a printing system as by configuring a particular printing queue, the administrator, in a user interface-driven approach, simply selects one or more prioritizers for that particular queue. Using each prioritizer's user interface component, the system administrator can then parameterize the prioritizers and assign a priority order to the prioritizers for that particular queue.

Turning now to a discussion of FIG. 2, a specific system 200 is presented that embodies the principles discussed just above. It is to be appreciated and understood that the description that follows constitutes but one example and is not intended to limit application of the claimed subject matter to this particular system.

Accordingly, system 200 includes, in this example, one or more client devices 242 and one or more print servers 288. Here, client device 242 and print server 288 can include components that are the same as or similar to those described in connection with FIG. 1. However, for purposes of simplicity, these components are not shown in the FIG. 2 example.

In accordance with one embodiment, client device 242 comprises a prioritizer user interface 244. User interface 244 is configured to permit a system administrator (or other user) to program or otherwise configure prioritizers, as mentioned above. In the illustrated and described embodiment, user interface 244 displays a customized user interface to represent prioritization data (described below) for a printer or printers. The prioritizer user interface supports the following methods:

Name—As well as its logical ID, the prioritizer user interface has a human readable display name.

AppComponentID—This is a prioritizer user interface's unique component id.

A prioritizer can be invoked to either acquire its initial configuration data, or to change an existing configuration. These operations are supported by GetConfiguration and ChangeConfiguration commands that each prioritizer supports.

In the illustrated and described embodiment, print server 288 comprises one or more of the following objects, each of which is described below: a scheduler object 252, a print job object 254, a printer object 256, a logical server object 258, a priority order object 260, prioritizer data object 262 and a prioritizer object 268. In addition, a data interface component 270 provides a mechanism by which the client device 242 and the print server 288 can communicate. Any suitable data interface and protocol can be utilized.

Scheduler Object

In the illustrated and described embodiment, the scheduler object 252 is responsible for selecting print jobs to send to a particular printer. To do so, the scheduler object processes the data that are produced by the prioritizers.

In addition, the scheduler object ensures that priorities on print jobs, as described below, are honored. Further, the scheduler object manages print jobs in an effort to ensure a desirable throughput through the system. Hence, the scheduler object is charged with the responsibility of attempting to provide all print devices with the appropriate data at appropriate times to avoid any undue delays. Further, as will be discussed below, the scheduler object attempts to ensure some level of fairness if the priorities otherwise lead to job starvation.

In the illustrated and described embodiment, the scheduler object is configured to be able to select from a large number of print jobs on a large number of physical devices, without incurring a significant overhead. As it is desirable to maintain a flexible set of priorities, the queues are based on a skew-heap implementation of a priority queue having the following properties:

$O(\log_2 N)$ for both insertion and removal;

Intrusive implementation—No memory is required for insertion or removal—hence items can always be inserted or removed from the queue.

A skew heap always remains statistically balanced. A vector based heap is guaranteed to remain balanced but requires an external vector in order to function.

For a given priority, the system maintains a First-In-First-Out (FIFO) queue of print jobs at that particular priority. This is useful for reducing the overhead for scheduling jobs at the same priority.

Figure 3:
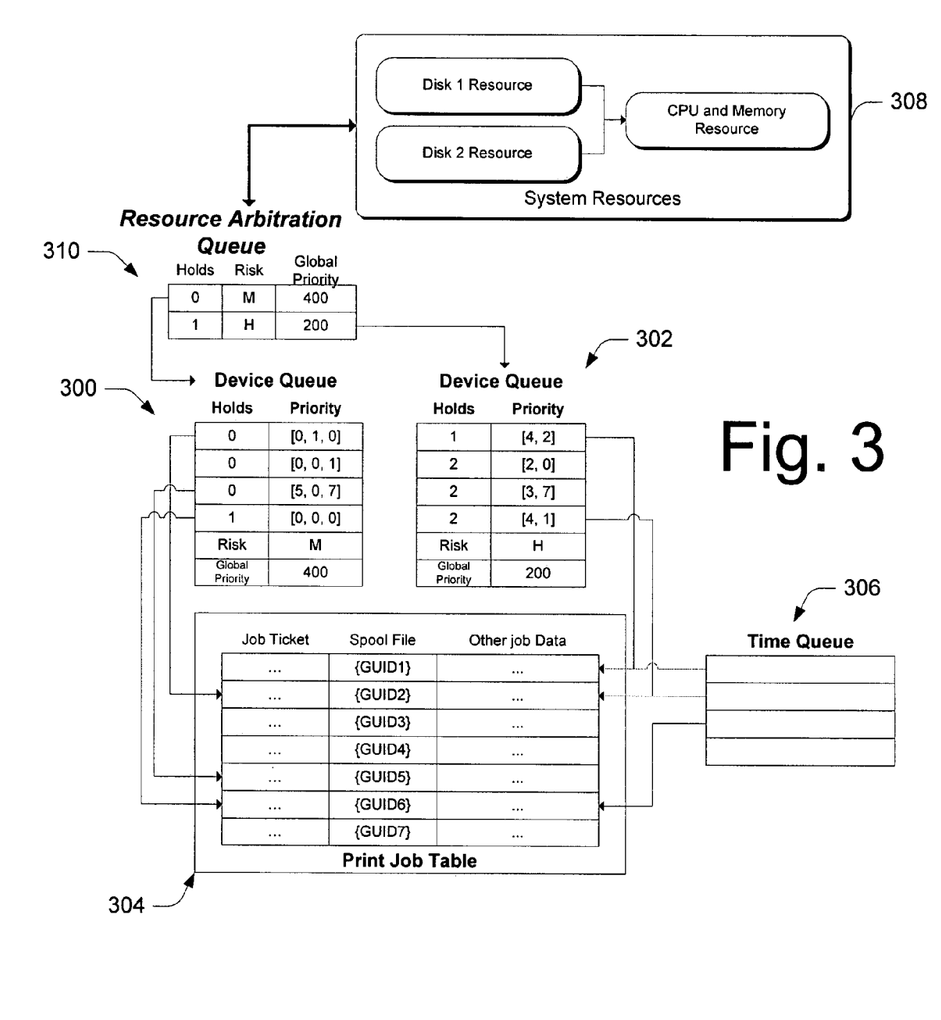
FIG. 3 is a block diagram that illustrates a scheduling system including various scheduling queues in accordance with one embodiment.

In addition, in accordance with one embodiment, the system maintains three logical types of priority queue—a time priority queue, a printer priority queue and a resource arbitration queue, each of which is described in more detail in FIG. 3. Preliminarily, however, consider the following.

A time priority queue is a priority queue that uses, as its priority, the time that the job should be rescheduled. For example, if a print device went into an error state, the job would go into the time queue with the desired time that it should be removed (e.g., in 5 seconds) as its priority. The times are not stored as deltas (or changes), but rather as absolute times to prevent drift caused by small delays in the scheduler object.

A printer priority queue is a queue that represents the relative prioritization in the queue against a device.

A resource arbitration queue is a queue of printer queues whose goal is to balance load fairly amongst printer queues. All of this is discussed below in more detail.

Print Job Object

A print job object 254 is created and represents a particular print output request. Each print job object supports two commands: a ChangePriority command and a ChangeScheduleTime command that are not accessible from clients.

A prioritizer object (described below) can call commands to change the priority or scheduled time of the associated job. As a result, the job will be automatically moved in its scheduling queue when these commands are called. Both commands take the new time or priority, and a prioritizer's unique component id (described below) and the system uses these to work out which field of the priority n-tuple to change, as will become apparent below.

Printer Object

The printer object 256 is the logical unit of scheduling in the print system. Hence, it is also the object that stores the prioritizer's configuration data. In the illustrated and described embodiment, a printer object has a one-to-one correspondence to an interface to a physical printer.

Logical Server Object

Prioritizer objects are installed on a logical server. A logical server also has a set of priority orders created by an administrator. One reason that a logical server object is provided is that in some cases, a single physical server can have more than one logical server. For example, a print cluster has a number of logical servers that move between the nodes in the cluster at the discretion of the administrator or due to failures of the physical cluster nodes.

Priority Order Object

A priority order object 260 is used to define the priority order of a sequence of one or more prioritizer objects. In the illustrated and described embodiment, a prioritizer can only assign a weight to a job or schedule it forward in time. How this weight is determined is parameterized both by its corresponding data in the queue, and by other data associated with the job, such as its so-called job ticket. An administrator can change the queue data and can change the relative precedence of the prioritizers. For example, given one prioritizer that prioritizes jobs submitted by executives over jobs submitted by normal staff members, and another that decreases the priority of large jobs, the administrator can specify one priority order of <Executive Privilege><Large Job Penalty> and another of <Large Job Penalty><Execute Privilege>. In the latter priority order, an execute job will be privileged only if it is not large.

In the illustrated and described embodiment, there is always one priority order which just maintains the time interval in which to print, a user-requested priority, a mandatory time priority and a default global priority penalty. This is to maintain compatibility, in an implementation example, with print servers currently implemented by the Window® NT platform. In addition, the priority order object adds the mandatory time capability and provides a default mechanism to ensure inter-queue fairness.

Prioritizer Data Object

A prioritizer's configuration is associated with a particular print queue. The configuration conforms to the prioritizer's XSD schema. In the illustrated and described embodiment, a given prioritizer is always invoked for a printer/job combination. In this particular example, prioritizer data object 262 has the following fields:

Prioritizer ID—This is the unique id of the corresponding prioritizer and allows the print system to associate the correct prioritizer with its data;

Data—This is an XML document conforming to the XSD schema stored in the prioritizer;

ShouldBump—This is a Boolean field that records whether this field should be used to bump other jobs. If a job is bumped, it is moved off the queue if this field is of higher priority, even if the document has already started printing.

Prioritizer Object

In the illustrated and described embodiment, a prioritizer object 268 is a pluggable component that can assign a weight to a job or can postpone it forward in time (possibly indefinitely). Prioritizer objects have the following properties:

Name—The display name for the prioritizer. This is different from its logical ID, which will typically be a GUID or a strong name;

Data Schema—This is an XSD schema describing the format of the prioritizer's data;

UIComponentID—This is the ID of its corresponding UI component. This component can be downloaded from the server if necessary to display the configuration of the per-printer prioritization data;

Type—This is an enumeration which identifies how the value returned by the prioritizer should be interpreted. In this embodiment, type identifies a time boost, a time fifo, a relative priority or a global priority effect, each of which is described below.

Prioritizer objects also support a method called Job-Change( ). This method is called by the print system whenever a job arrives, when it is finished spooling, when it starts to print and when it is done printing. It is also notified whenever the delay time or the mandatory time for the job elapses. If the prioritizer wishes to listen for other events, it can use the system's data interface notification mechanism.

Multiple different types of prioritizers can be used and each can have a different set of behaviors directed to achieving a desired result. In the illustrated and described embodiment below, there are four different types of prioritizers supported by the system, each of which is described in more detail in the section immediately following. It is to be appreciated and understood, however, that these particular types of prioritizers are not intended to limit application of the claimed subject matter.

Determining a Job's Priority

In the illustrated and described embodiment, a print job's priority is represented by three pieces of data: a relative priority tuple, a global priority effect, and a hold count.

A relative priority tuple is a set of numeric weights, e.g. [W1, W2, W3, W4]. Each weight is assigned by a prioritizer object. When two print jobs are positioned in a queue, each weight is compared with the corresponding weight in the other job's tuple in order to determine the relative priority of the job.

A global priority effect is a single value that indicates the effect of processing a particular print job on the physical printer's global priority. The global priority effect can be a negative effect or a positive effect. For example, a job printed by an executive could be assigned a large priority boost, while otherwise the job could be assigned a global priority penalty that depended on its size. If multiple prioritizers in a queue return a global priority effect, the result is summed to determine the overall priority effect for the job.

A hold count can be used by prioritizers to hold a print job in a queue and release it at a later stage. Holding a print job can be useful when the data needed to determine a job's priority is not immediately known. For example, if a prioritizer wanted to lower the priority of a job larger than 100K, it would have to hold the job in the queue until the size crossed this threshold. Then the priority could be adjusted and the job released. Holds can also be used to delay a job in time. This is described later in this document. Effectively the hold count is always the first element of the tuple since any active holds prevent the job from printing. Accordingly, the job tuple can be represented as follows:

[HoldCount, W1, W2, W3, W4].

In operation, a prioritizer object is passed its configuration data and the job which it has to prioritize. The prioritizer then processes its configuration data and associated job data and returns a weight and a status. The status indicates the following information:

Success—the prioritizer correctly determined the priority of this job.

Hold—the prioritizer needs to hold this job. It also either implies that this is a time prioritizer that will automatically be notified at a certain time (at which it can release the hold), or that it has registered for the appropriate change notifications that will cause it to release the job at some other state.

Error Hold—The prioritizer did not have sufficient resources to correctly hold the job. The effect of this is the same as a hold except that the prioritizer will be periodically called hopefully allowing it to either release its hold, or allowing other resources to become available that allow the prioritizer to function.

Error—The prioritizer had an unexpected error. Since we do not know that the prioritizer will succeed at a later date, the job is deleted.

In the event that the status is a Hold, Error or Error Hold, the prioritizer object will also return certain user information that can be displayed via the prioritizer user interface 244 (FIG. 2). This user information associates the following information with the particular print job:

A hold GUID. If the user interface recognizes the GUID, it can load the localized string in the client's locale;

An array of string parameters which, when formatted by the string associated with the GUID, produces a human readable explanation;

A fallback string. This is a string loaded from a resource on the server side that supplies a string in the case the client does not recognize the GUID. The string will first be retrieved in the client's locale and then in the system locale. There is a reasonable probability that the caller's language is not available on the server and in this case they could get back a message in the server's default language.

As noted above, the prioritizer user interface 244 displays this information in the event that the print job is in a hold state. This is intended to reduce user confusion if their job is held in the queue. For example, if a prioritizer delays large print jobs to print between 2 A.M. and 6 A.M., the user information that is returned to the client could cause the following message to be displayed for the user:

"The job has been held in the queue to print between 2 A.M. and 6 A.M. because it exceeded a size of 10 MB. Please contact your system administrator if you require an explanation."

As noted above, in at least one embodiment, there are four different types of prioritizers that can be utilized: a relative priority prioritizer, a global priority prioritizer, a time FIFO prioritizer and a time boost prioritizer, each of which is separately described below.

A relative priority prioritizer constitutes the simplest case of a prioritizer. The relative priority is a set of weights that are used to rank one print job against another print job. In one embodiment, lower numbers imply higher priority. Hence, a print job that carries a relative priority of 0 has a higher relative priority than one that carries a relative priority of 1.

A global priority effect prioritizer utilizes a global priority effect as a modifier that influences the relative weight of one physical printer against another physical printer. For example, penalties to the relative weight of one printer can be assigned on a per-page-printed basis. Thus, bigger jobs will have a more negative impact on a particular printer than smaller jobs.

A time FIFO prioritizer utilizes a time field that allows a job to receive an overriding boost in priority after an elapsed time, and then be processed in FIFO order. This can be used to prevent starvation of a print job. For example, if a tuple were defined as [Tfifo1, P1], and the time FIFO was set at 7 P.M., then after 7 P.M., the print job would jump in priority. If P1 had the effect of penalizing large jobs, this would allow a large job to eventually print if it had been starved in the queue up to this time. All jobs that reached this threshold would then be printed in FIFO order.

A time boost prioritizer utilizes a time boost field that operates in the same manner as a time FIFO field, except that instead of the priority of the job after the set time being the set time, the priority after the set time is set to 0 (recall that a 0 carries a higher priority). This means that a time boost is used for giving a job an increase in privilege at a certain time, but the remaining priority fields still remain significant in determining job order for jobs that have received a boost.

In the illustrated and described embodiment, the system handles times fields slightly differently than relative priority fields. That is, all of the times returned by the prioritizers are compared and the smallest time that is still in the future is ascertained and the job is then placed in the time queue until this time elapses. When the time elapses, the job is passed back to the prioritizer. Typically the prioritizer could re-adjust the time at this point, or release a hold.

As an example, consider the following. Consider a set of prioritizers that implement the following tuple:

[Tfifo, Pexec, Tboost, Psmall, Tdelay].

In this example, each of the components of the tuple is defined as follows:

| Component | Definition |
| --- | --- |
| Tdelay | Holds a job larger than 100 MB until 2 A.M.; Uses a Time Boost as described above. |
| Psmall | Gives small jobs priority over large jobs. |
| Tboost | Sets a Time Boost for the current time plus one hour. |
| Pexec | Prioritizes jobs submitted by executives over jobs submitted by normal users. |
| Tfifo | Sets a fifo time for the current time plus 3 hours. |

The effect of Tboost is that large jobs that have been held in a queue for over an hour will jump in priority over small jobs at this time. However, if small jobs have also been delayed for a long time, they will still have priority over large jobs. The effect of Tfifo is that regardless of the time boost at the end of the hour, and regardless of the size of the jobs they submit (if they are smaller than 100 MB), if any job has been held in the queue for more than 3 hours, then it will be printed strictly in FIFO order (unless it is larger than 100 MB). Jobs larger than 100 MB will print after 2 A.M. Unless these large jobs have been held in the queue for less than 3 hours (which is unlikely) they will be printed in FIFO order.

As can be appreciated from this example, the prioritizers can be utilized to provide a powerful mechanism for programming the printing system. By selecting the appropriate prioritizers and configuring them accordingly, system administrators are given a powerful tool to custom tailor their particular printing system to uniquely meet whatever needs and demands their particular system may have.

Starvation Risk

As noted above, in at least some embodiments, the printing system is configured to attempt to ensure that a printing device that needs to receive data to continue printing receives priority over a printing device that has a large amount of data queued up.

In accordance with one embodiment, each queue maintains a "starvation risk" which can have the values <Low>, <Medium> and <High>. The starvation risk is an indication of how likely it is that a given printer will idle. Starvation risk data is used by a rendering component upstream of the device scheduler to prioritize its jobs. It will preferentially start rendering jobs that are destined for queues that are at a higher starvation risk than others, regardless of the other job priorities. This is used to prevent high priority jobs from always swamping other jobs in a system. Hence, if a queue has a large number of high priority jobs, it will eventually fill and its starvation risk will drop. At that point, other queues will preferentially receive jobs until the starvation risk exceeds theirs again.

Any suitable method can be used to calculate the starvation risk. In but one embodiment, the printer throughput is first estimated. This is done by sampling the rate at which the device consumes data over a time interval, and then calculating the throughput for that interval as follows:

$$R_m = \text{<Bytes Sent>}/\text{<Time Interval>}.$$

However, as will be appreciated by the skilled artisan, printer throughputs can be quite variable since printer buffers (or hard drives) fill very rapidly, but pages typically print far more slowly. Thus, there should be some way of amortizing the "burstiness" of the device throughput.

In accordance with one embodiment, this is done by calculating the consumption rate as the maximum of the minimum rate that is defined for a particular queue, with, if desirable, an appreciation of the consumption rate history. Mathematically speaking, a single tunable parameter $\alpha$ is used and can have a value between 0 (which represents no history) and 1 (which represents only history). This tunable parameter is incorporated in the following calculation, which, as noted above, computes the consumption rate in a manner that takes into account the burstiness of the device throughput:

$$R_n = \max(\alpha R_{n-1} + (1-\alpha) R_m, R_{min})$$

This calculation is not performed if no data is being sent to the device. The printer driver, or other pluggable system components (such as a print rendering driver or protocol adapter) or the administrator can choose a value for a that models the device correctly. Given the calculation above, the total byte count of all the jobs in the particular queue can be summed and from this, an estimation of the time to starvation can be computed as:

$$T_{starvation} = ByteCount/R_n.$$

In accordance with one embodiment, two time intervals are defined and used to classify a particular device's starvation risk. If the estimated starvation time exceeds a first of the intervals, the starvation risk moves from high to medium. If the estimated starvation time exceeds the second of the intervals, then the starvation risk will be classified as low.

As an example, consider the following. Given a printer that accepted 10 KB in the last second and 5 KB this second, with an $\alpha$ of 0.8, the estimated consumption rate in accordance with the formula given above is $0.8*10k+(1-0.8)*5kB.s^{31\ 1}$ which is $8+1\ kB.s^{-1} = 9\ kB.s^{-1}$. If the queue currently has 900 kB of data in it, then the time to starvation is $=900/9\ s=100\ s$. If we define the first starvation risk interval as being 1 minute, and the second interval as 10 minutes, then this particular queue would be classified as having a medium starvation risk.

Scheduling Queues

To provide some context for the discussion that appears above, reference will shortly be made to FIG. 3. However, prior to considering FIG. 3, consider the following, which provides some context for the discussion of FIG. 3 that follows.

In accordance with the embodiments described above and below, the scheduling system's efficiency is enhanced by implementing the various queues as priority queues, as will be appreciated by the skill artisan. A priority queue is a data structure that defines a logical tree having a basic rule that any parents must be smaller than both of its children. With priority queues, elements can be inserted in the queue, on average, by looking at a number of elements which is the log of the number of total number of elements of the logical tree.

Hence, this characteristic makes scheduling very efficient. In addition, this is also why the prioritizers produce and utilize a tuple. Specifically, a tuple allows the scheduler to compare two particular jobs by looking at each job's tuple and then ordering the jobs appropriately. In addition, when the notion of starvation risk is factored in and considered by the scheduler, a very powerful scheduling paradigm is provided.

Turning now to the FIG. 3 example, two device queues 300, 302 are shown. These device queues are each a queue of jobs that are destined for a physical printer. The jobs in the device queues can be ordered as described above. In this example, some of the jobs have holds on them. This causes the jobs to automatically be of a lower priority than jobs without holds, as noted above. As will be appreciated in view of the discussion above, lower priority jobs cannot immediately print.

Independent of the individual device queues, a print job table 304 is provided and stores all of the jobs (or indicia of all of the jobs) on the system. If a job is submitted to a pooled printer (pooled printers are discussed below), then the job appears in all of the print queues to which it is destined. This is done for a couple of different reasons. First, the pooled queue is effectively a virtual queue that contains all of the jobs in all of the pooled devices. Structuring the queues this way allows a user to see other jobs that are contending for the same resources whether they are sent to the same pooled queue or not. Second, each physical printer can have a different priority order, and each prioritizer for each printer could conceivably have different configurations. What this means is that in many cases, it is meaningless to compare the priority tuples across multiple physical printers.

In addition, if any of the elements of the tuple describing the job represent a point of time that is in the future, they will be simultaneously placed in a time queue 306. The time queue is ordered in time and stores elements according to their absolute time. This prevents any long-term skew due to processing the jobs when they are removed from the queue.

As will be appreciated by the skilled artisan and others, a printing system typically has a fixed set of resources. In this particular example, system resources 308 comprise two disks and CPU and physical memory. The task of the scheduler (e.g. scheduler 252 in FIG. 2) is to assign jobs with a relative priority as specified by an administrator. This is handled by the queue relative prioritizers. The scheduler also must attempt to choose an efficient and, in many if not all cases, what it considers to be the optimal number of jobs to schedule according to the available system resources. The reason for this is that as far as overall system throughput is concerned, it can be more effective to schedule less work than more. For example, if so many jobs are scheduled to render that the system starts paging operations, such can result in the system performing worse than if it scheduled fewer jobs, e.g. "thrashing" as discussed above. Similarly, if there are three very fast printers all receiving data from one disk, it might actually be faster to only schedule two of the jobs in order to reduce the extra disk or head movement that would result if the third job was scheduled.

The precise number and types of resources is not important. The spooler will maintain a hierarchy of resources that must be acquired by a job before it can print. The resources required by the job can be estimated by some heuristic and then the actual resources in use can be confirmed by measurement. The job will then acquire its resources in some predetermined order, and will release them once it is complete. This mechanism can reduce throughput but does not result in deadlock or live-lock. Regardless of resource constraints one job will be scheduled for printing and one job will be scheduled for rendering. Jobs available for printing will get first priority on resources. Jobs requiring rendering will have a lower priority than jobs ready for printing, but, since a server might receive both pre-rendered jobs and jobs that require rendering, the resources will have a reserve that is held for rendering. Any portion of the rendering reserve that is not used will be assigned to printing jobs.

Consider further that system resources are naturally global to the machine, but the relative priority of jobs within a queue depends both on the order of the prioritizers in the queue and the configuration data supplied to those prioritizers. Thus, it is in general difficult if not impossible to determine the relative priority of jobs from different queues. One could mandate that there is only one priority order and configuration on a machine, but this becomes very difficult to manage and maintain when one considers that print servers might be migrated or merged or, in the distributed case, could move from one node to another. One could also reserve some system resources for each queue, but this approach fails to take full advantage of the resources on the server when queue load is not balanced.

In accordance with one embodiment, the solution chosen for resolving this relative ordering problem is to use the following pieces of data for relatively prioritizing the queues: the number of holds on the topmost job in the queue, the starvation risk of the job, and the queue global priority.

With regard to the number of holds on the topmost job in the queue, consider the following. If the job at the top of a queue has a hold on it, it is pointless to attempt to process it. If any job in the queue does not have a hold, it will be at the top of the queue since holds are always the highest priority in determining job order.

With regard to the starvation risk of a particular job, regardless of any other fairness considerations in the print server, if a particular device is at risk of starvation and another is not, the device at risk for starvation will be scheduled first.

With regard to the queue global priority (referred to as the "Resource Arbitration Queue" 310 in FIG. 3), such is maintained as a priority queue of the individual print queues. In operation, the global priority queue resembles, in some respects, a thread or process priority in most general purpose operating systems. Specifically, each job has a global priority effect whose value can change based on different factors. In one embodiment, the default behavior of the global priority effect is to deduct one point of global priority per page in the job. Additionally, the global priority effect can also improve the priority of a job. For example, there might be a category defined as "Rush Job", in which case the global priority effect might be automatically improved by a large number. If a job negatively impacts the global priority, this effect is calculated after the job is scheduled (i.e. after it has taken the resources for which the queue is being penalized). The negative priority effect of the currently processing jobs on the queue is always in effect while those jobs are processing, regardless of any normalization that would normally occur. In addition, the notion of a global priority recovery can be provided by having queue's priority improve gradually over time up to some set limit.

In addition to the global priority effect that can be associated with each job, in accordance with one embodiment, each queue can have a number of configurable parameters. In the present example, these configurable parameters include, without limitation, a global priority range, a normalization rate, and a normalization time interval.

With regard to the global priority range, lower priority numbers receive a higher priority. A queue's priority will always stay in this range regardless of any job effects and priority normalization. A standard range can be, for example, 1000-2000. Administrators can define other queue ranges and use the ranges to penalize or raise the priority of a queue relative to other queues. For example, the administrator could assign a priority range of [0-1000] for a set of queues that would always receive preference over the queues with the default range.

The normalization rate refers to a rate at which the priority normalizes over time. A default can be that the priority number is lowered by one point every time interval.

The normalization time interval refers to a default time interval for normalization to occur. An exemplary default interval might be one minute.

Scheduling in the Renderer

Consider now the relationship between the renderer and the device scheduler. Each of these components essentially has its own logical queues; a job stored in the renderer is logically a different job than its corresponding job stored in the client device or the device scheduler. Corresponding print jobs in each of these queues are associated by virtue of a job GUID (globally unique identifier) which is consistent across process and machine boundaries.

In operation, the renderer typically receives print job data in an intermediate format (such as enhanced metadata format (EMF)), and processes the intermediate format via a pipeline of filters to produce data in a different format which is then sent on to the server for scheduling and provision to a printing device. Further, the characteristics of a renderer and device scheduler are very different. Specifically, the device scheduler is said to be "I/O bound"—which means that often, the device scheduler will actually wait for a printer to respond to a data request. The renderer, on the other hand, is typically "CPU bound"—which means that the renderer is processing data and writing its data out as fast as a particular computing device will allow. Fairly logically then, it follows that two different types of scheduling should occur with regard to each of these components.

In accordance with one embodiment, the starvation risk of a particular printer is used to coordinate rendering activities to reduce the likelihood that a starvation situation will occur. More specifically, the renderer will schedule jobs preferentially for a downstream physical printer if that printer is either idle or about to finish a job (i.e. it carries a high risk of starvation). The renderer will less preferentially schedule jobs for rendering if the jobs are destined for a printer that has a large amount of data already pre-rendered and hence is at a low risk of starvation.

Print Pools

A print pool is a mechanism that defines a many-to-many relationship between print queues and physical printing devices. That is, a print server can have one logical printer that is associated with and provides data to multiple printers.

Figure 4:
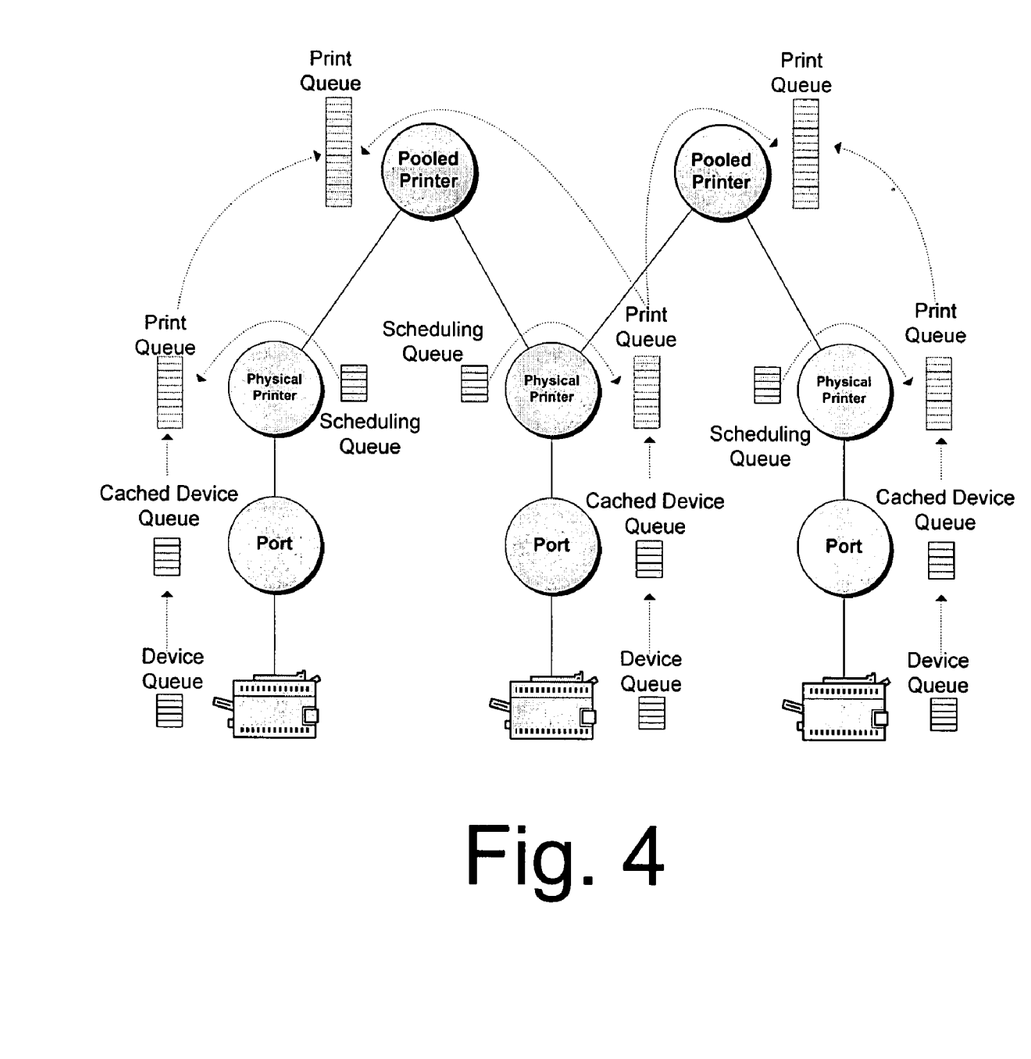
FIG. 4 is a block diagram of a system that illustrates the concept of pooled printers.

As an example, consider FIG. 4 which shows a system with two pooled printers. Each pooled printer is associated with two physical printers and each has its own corresponding print queue. The print queues for the pooled printers are determined from the print queues associated with each of the physical printers which, in turn, are determined from each physical printer's scheduling queue and an associated port's cached device queue. In this example, the queues designated as "Print Queue" are virtual queues.

In this example, a print job that is scheduled against two physical printers from one pooled printer is visible both in each physical printer, as well as the virtual printer pool. In addition, the print queue for a particular pooled printer is determined by the merging of the print queues associated with each of the corresponding physical printers.

CONCLUSION

The above-described printing systems and methods can permit the priorities of print jobs to be programmable. A scheduler component oversees print job management and scheduling, and works in concert with components called prioritizers, to provide for ease of programming and customization. In at least some embodiments, an interface to the system is provided to allow prioritizers to be programmed and inserted to customize the behavior of the scheduler according to different print job properties. In at least some embodiments, the system utilizes a model for the relative prioritization of print queues in the system to enforce a fair balancing of system resources between print queues. In at least some embodiments, the system can independently schedule the rendering and printing operations when printing a job and can use a heuristic known as "starvation risk" to help ensure that throttling rendering in the system does not result in device starvation.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media having computer-readable instructions thereon which, when executed, implement a computer architecture comprising:
   multiple prioritizers configured together to define a sequence of prioritizers associated with a print queue and configured to produce a tuple of multiple priority values associated with a print job for use in scheduling said print job; and
   a scheduler configured to process said tuple and schedule print jobs for the print queue.

2. The computer-readable media of claim 1, wherein each prioritizer is configured to produce at least one of a weight value or a time value.

3. The computer-readable media of claim 1, wherein said computer-readable instructions
   permit a priority order to be assigned to individual prioritizers of the sequence.

4. The computer-readable media of claim 1, wherein said computer-readable instructions further define an individual prioritizer user interface that is configured to enable a user to configure an associated prioritizer.

5. The computer-readable media of claim 1, wherein said computer-readable instructions further utilize one or more priority queues to assist the scheduler in scheduling print jobs.

6. The computer-readable media of claim 1, wherein said computer-readable instructions further utilize one or more priority queues to assist the scheduler in scheduling print jobs, and wherein:
   a first type of priority queue comprises a printer priority queue that represents a relative print job prioritization in a print queue associated with a printing device; and
   a resource arbitration queue that represents a queue of print queues.

7. The computer-readable media of claim 1, wherein said computer-readable instructions further utilize one or more priority queues to assist the scheduler in scheduling print jobs, and wherein:
   a first type of priority queue comprises a printer priority queue that represents a relative print job prioritization in a print queue associated with a printing device; and
   a resource arbitration queue that represents a queue of print queues; and
   wherein said one or more priority queues are utilized to maintain data comprising:
   a relative priority tuple for individual print jobs,
   a global priority effect that indicates an effect of processing a particular print job on an associated printing device's global priority, and
   a hold count that can be used to hold a print job.

8. The computer-readable media of claim 1, wherein each prioritizer can be selected from a group of multiple different types of prioritizers.

9. The computer-readable media of claim 1, wherein each prioritizers can be selected from a group of multiple different types of prioritizers, and wherein:
   a first type comprises a relative priority prioritizer that produces data that is used to rank one print job against another print job;
   a global priority effect prioritizer that utilizes a global priority effect as a modifier that influences the relative weight of one printing device against another printing device;
   a time FIFO prioritizer that utilizes a time field that allows a print job to receive an overriding boost in priority after an elapsed time; and
   a time boost prioritizer that utilizes a time boost field that allows a print job to receive a boost in priority.

10. A method comprising:
    maintaining, by a print server, individual device queues each of which being associated with a physical printer on which printing is to take place;
    maintaining, by the print server, for each device queue, a starvation risk that provides an indication of the likelihood that a given physical printer will idle;
    maintaining, by the print server, for each device queue, a sequence of prioritizers that provides a tuple of multiple priority values for each print job; and
    scheduling, by the print server, print jobs using at least the tuples and the starvation risk.

11. The method of claim 10, wherein the act of maintaining individual device queues comprises maintaining said queues as priority queues.

12. The method of claim 10, wherein the act of maintaining individual device queues comprises maintaining, for an individual device queue, a global priority value that is used to ascertain a global effect that an individual print job in the individual device queue will have on a printing system.

13. The method of claim 10, wherein the act of maintaining individual device queues comprises maintaining, for an individual device queue, a global priority value that is used to ascertain a global effect that an individual print job in the individual device queue will have on a printing system, and further comprising:

maintaining a resource arbitration queue that provides a prioritization of individual device queues based, at least in part, on a device queue's starvation risk and global priority value.

14. The method of claim 10, wherein the act of maintaining individual device queues comprises maintaining said device queues as part of a pooled printer system.

15. The method of claim 10, wherein the act of maintaining individual device queues comprises:

maintaining, for an individual device queue, a global priority value that is used to ascertain a global effect that an individual print job in the individual device queue will have on a printing system; and further comprising maintaining a resource arbitration queue that provides a prioritization of individual device queues based, at least in part, on a device queue's starvation risk and the global priority value.

16. The method of claim 15, wherein said acts are performed as part of a pooled printer system.

* * * * *

UNITED STATES PATENT AND TRADEMARK OFFICE
CERTIFICATE OF CORRECTION

| | | |
|---|---|---|
| PATENT NO. | : 7,548,335 B2 | Page 1 of 1 |
| APPLICATION NO. | : 11/067361 | |
| DATED | : June 16, 2009 | |
| INVENTOR(S) | : Mark A. Lawrence et al. | |

It is certified that error appears in the above-identified patent and that said Letters Patent is hereby corrected as shown below:

In column 16, line 27, in Claim 9, delete "prioritizers" and insert -- prioritizer --, therefor.

Signed and Sealed this
Third Day of May, 2011

David J. Kappos
*Director of the United States Patent and Trademark Office*